United States Patent [19]
Mühlbach et al.

[11] Patent Number: 5,558,192
[45] Date of Patent: Sep. 24, 1996

[54] FLUID COUPLING AND EXTERNAL CONTROL THEREFOR

[75] Inventors: Günther Mühlbach, Heidelberg; Heinz Wollmann, Bermatingen, both of Germany

[73] Assignee: Eaton Corporation, Cleveland, Ohio

[21] Appl. No.: 411,123

[22] Filed: Mar. 27, 1995

[51] Int. Cl.[6] .............................. F16D 35/02; F16D 43/25
[52] U.S. Cl. ................... 192/58.61; 192/58.683; 192/82 T; 192/83
[58] Field of Search .................. 192/58.683, 58.681, 192/58.6, 58.61, 58.62, 58.63, 58.65, 58.66, 58.68, 58.684, 83, 82 T

[56] References Cited

U.S. PATENT DOCUMENTS

| | | | |
|---|---|---|---|
| 1,598,677 | 9/1926 | Donning et al. ............. | 192/82 T X |
| 3,055,473 | 9/1962 | Oldberg et al. . | |
| 4,054,193 | 10/1977 | Streeter . | |
| 4,351,425 | 9/1982 | Bopp ............................ | 192/58.61 |
| 4,909,367 | 3/1990 | Elmer ........................... | 192/58.62 |
| 5,152,384 | 10/1992 | Brown .......................... | 192/58.61 |

Primary Examiner—Rodney H. Bonck
Attorney, Agent, or Firm—L. J. Kasper

[57] ABSTRACT

A fluid coupling device is disclosed in which flow of fluid from a reservoir chamber (35) into a fluid operating chamber (33) is controlled by a valve member (41), rotatable with a valve shaft (39). Rotation of the valve shaft (39) is normally controlled, in response to variations in ambient air temperature, by means of a bimetal coil (45). In accordance with the invention, a normally fixed outer tab (75) of the bimetal coil is attached to an output plunger (85) of an electromagnetic actuator (83). As a result, the operating condition of the fan drive can be changed between a disengaged condition and an engaged condition, in response to variations in a predetermined condition (73), other than ambient air temperature. For example, the fan drive can be operated in the engaged condition, even at relatively low ambient air temperature, when the vehicle air conditioning system is operating, or the fan drive can be put in a disengaged condition, even at relatively high ambient air temperature, when the vehicle or engine speed is above a predetermined maximum.

9 Claims, 3 Drawing Sheets

FLUID COUPLING AND EXTERNAL CONTROL THEREFOR

BACKGROUND OF THE DISCLOSURE

The present invention relates to fluid coupling devices, and more particularly, to such devices which include a temperature responsive bimetal element to control the operation of the fluid coupling in response to changes in ambient air temperature.

Although the present invention may be used advantageously in fluid coupling devices having various configurations and applications, it is especially advantageous in a coupling device of the type used to drive the radiator cooling fan of an internal combustion engine, and will be described in connection therewith.

A fluid coupling device of the type to which the present invention relates typically includes an input coupling member and an output coupling member. The output coupling member cooperates with a cover assembly to define a fluid chamber and a valve plate separates the chamber into a reservoir chamber and an operating chamber. The input coupling member is rotatably disposed within the operating chamber, and cooperates with the output coupling member to define a viscous shear space such that torque may be transmitted from the input member to the output member by means of a viscous shear fluid.

The valve plate typically includes a valving arrangement operable in response to variations in ambient air temperature to permit fluid to flow from the reservoir chamber, through a fill opening defined by the valve plate, into the operating chamber. Conventionally, the valving arrangement includes a valve member which covers or uncovers the fill opening in response to movement of a temperature-responsive bimetal element, which senses variations in the ambient air temperature.

Among the trends in the automotive and light truck industry has been the increasing percentage of vehicles equipped with air conditioning. In a typical vehicle installation, the air conditioning compressor, which must dissipate a substantial amount of heat, is cooled by air in the engine compartment, i.e., the same air which is drawn through the radiator to cool the engine coolant. Thus, when the ambient air surrounding the viscous fan drive reaches a predetermined temperature, the bimetal on the fan drive will actuate the valving and the fan drive will operate in its engaged condition. When this occurs, the viscous fan drive rotates the radiator cooling fan, pulling air through the radiator to cool not only the engine coolant but also the air conditioning compressor.

Unfortunately, it frequently occurs that the air conditioning compressor is operating, and requires cooling, in a situation in which the ambient air surrounding the viscous fan drive is below the predetermined temperature at which the fan drive would normally engage. Therefore, the fan drive continues to be in the disengaged mode, because of the relatively low ambient air temperature, but unless cooling is provided for the air conditioning condenser, it is possible the air conditioning system will not operate properly.

There are also certain vehicle applications for viscous fan drives in which the vehicle OEM chooses to have the viscous fan drive operate in a disengaged mode at relatively high engine speeds, when the "ram" air passing through the radiator is sufficient for cooling purposes, without the need for operation of the radiator cooling fan. Typically, in such situations, the ambient air temperature does not drop to a low enough temperature to cause disengagement of the viscous fan drive, even though its operation in the engaged mode is not really required. Continued operation of the fan drive in such situations represents a waste of engine horsepower.

SUMMARY OF THE INVENTION

Accordingly, it is an object of the present invention to provide a fluid coupling device of the type which normally operates in either an engaged mode or a disengaged mode, in response to ambient air temperature, wherein it is possible to cause the coupling device to operate in a different mode in response to an external input signal, probably unrelated to the ambient air temperature.

It is a more specific object of the present invention to provide an improved fluid coupling device which accomplishes the above-stated object without the need for additional valving structure to control the operation of the fluid coupling device.

The above and other objects of the invention are accomplished by the provision of an improved fluid coupling device of the type including a first rotatable coupling member defining an axis of rotation, and enclosure means associated with the first coupling member to define a fluid chamber therebetween. A valve means is associated with the first coupling member and is disposed to separate the fluid chamber into a fluid operating chamber and a fluid reservoir chamber. A second rotatable coupling member is disposed in the fluid operating chamber and is rotatable relative to the first coupling member. One of the first coupling member and the enclosure means cooperates with the second coupling member to define a viscous shear space therebetween, the valve means being operable to control the flow of fluid between the reservoir chamber and the operating chamber. The valve means includes a fluid inlet port and a valve member moveable between an open position permitting fluid flow through the inlet port, and a closed position substantially blocking fluid flow through the inlet port. A valve shaft is operably associated with the valve member for movement therewith, and a bimetal is operably associated with the enclosure means and in operable engagement with the valve shaft to move the valve member between the open and closed positions in response to variations in ambient air temperature. The bimetal element includes a moveable portion in operable engagement with the valve shaft and a portion normally fixed relative to the enclosure means.

The improved fluid coupling device is characterized by actuator means operably associated with the enclosure means for rotation therewith. The actuator means includes an actuator member in operable engagement with the normally fixed portion of the bimetal element, and operable in response to variations in a predetermined condition, to move the normally fixed portion of the bimetal element between a normal position and an actuated position.

DESCRIPTION OF THE PREFERRED EMBODIMENT

Figure 1:
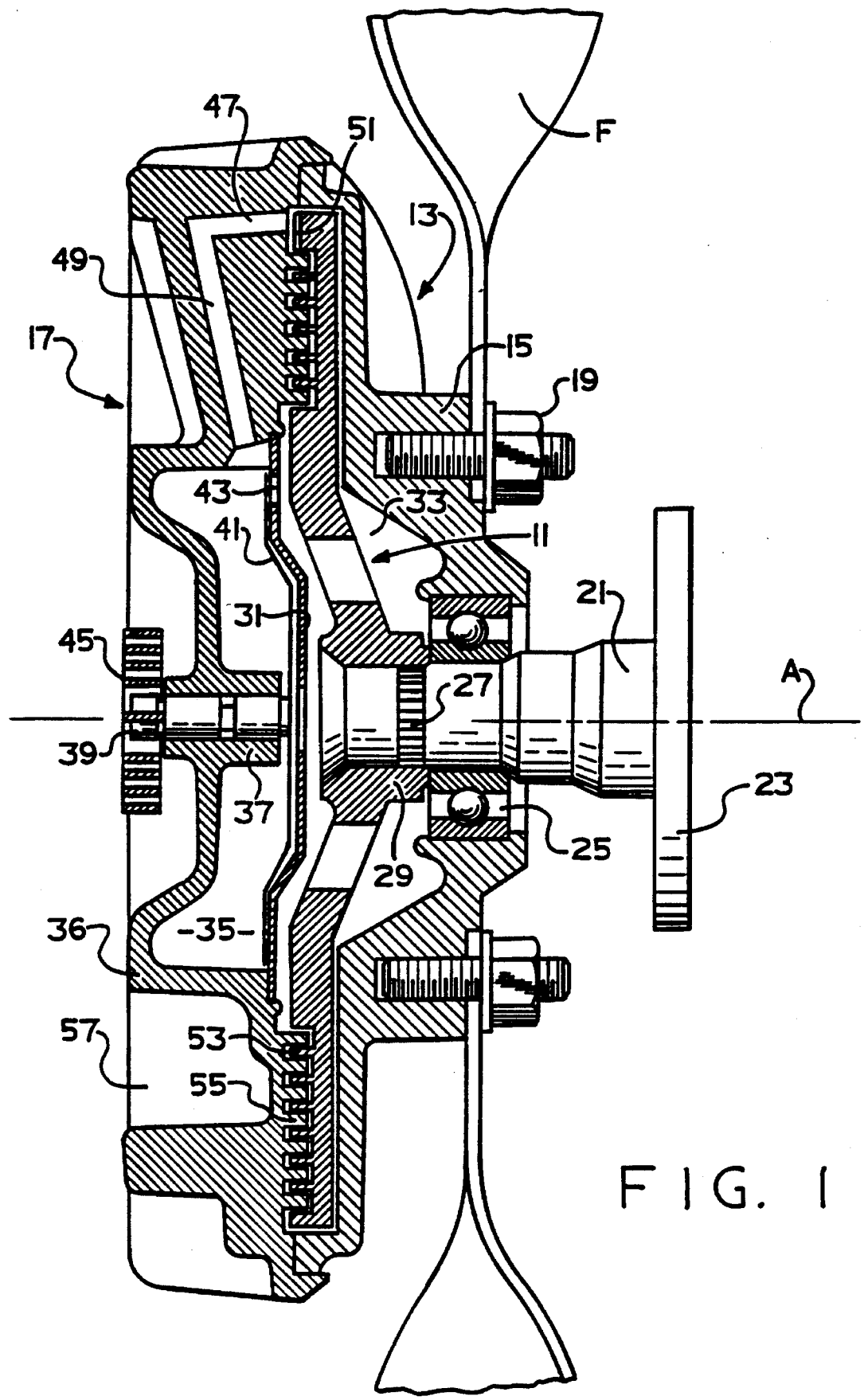
FIG. 1 is an axial cross-section of a typical fluid coupling device of the type with which the present invention may be utilized.

Referring now to the drawings, which are not intended to limit the invention, FIG. 1 illustrates one preferred form of a fluid coupling device (viscous fan drive) of the type with which the present invention may be utilized. The fluid coupling device illustrated in FIG. 1 includes an input coupling member generally designated 11, and an output coupling assembly, generally designated 13. The output coupling assembly 13 includes a die cast housing member (body) 15 and a die cast cover member 17, the members 15 and 17 being secured together by a rollover of the outer periphery of the cover member 17, as is well known in the art. The fluid coupling device is adapted to be driven by a liquid cooled engine (not shown) and, in turn, drives a radiator cooling fan F. The fan F may be attached to the housing member 15 by means of a plurality of bolts 19. It will be understood, however, that the use of the present invention is not limited to any particular configuration of fluid coupling device or to any particular application thereof, except as is specifically noted hereinafter.

The fluid coupling device includes an input shaft 21 on which the input coupling member 11 is mounted. The input shaft 21 is rotatably driven, typically by means of a flange 23 which may be bolted to the mating flange of an engine water pump (not shown). The input shaft 21 functions as a support for the inner race of a bearing set 25, which is seated on the inside diameter of the housing member 15. The forward end (left end in FIG. 1) of the input shaft 21 has an interference fit between a serrated portion 27 and an opening defined by a hub portion 29 of the input coupling member 11. As a result, rotation of the input shaft 21 causes rotation of the input coupling member 11.

The housing member 15 and the cover member 17 cooperate to define a fluid chamber which is separated, by means of a circular valve plate 31, into a fluid operating chamber 33 and a fluid reservoir chamber 35. Thus, it may be seen that the input coupling member 11 is disposed within the fluid operating chamber 33.

The cover member 17 defines a raised, annular reservoir-defining portion 36, which is disposed to be generally concentric about an axis of rotation A of the device, and further defines a generally cylindrical shaft support portion 37. Rotatably disposed within the portion 37 is a valve shaft 39 extending outwardly (to the left in FIG. 1) through the cover member 17. Attached to the inner end (right end in FIG. 1) of the valve shaft 39 is a valve arm 41, which may be better understood by reference to U.S. Pat. No. 3,055,473, assigned to the assignee of the present invention and incorporated herein by reference. Movement of the valve arm 41 controls the flow of fluid from the reservoir chamber 35 to the operating chamber 33, through a fill opening (port) 43 formed in the valve plate 31.

Operatively associated with the outer end of the valve shaft 39 is a temperature-responsive bimetal element, which in the subject embodiment, and by way of example only, comprises a coil member 45, which includes an inner end portion 46 in engagement with the valve shaft 39. The manner in which the bimetal coil member 45 operates to control the movement of the valve arm 41, in response to variations in ambient air temperature, is well known in the art, and will not be described further herein.

The cover member 17 defines an axial passage 47 in communication with the fluid operating chamber 33, and a generally radial passage 49 which provides fluid communication from the axial passage 47 to the fluid reservoir chamber 35. Disposed adjacent the axial passage 47 is a pumping element (wiper) 51, operable to engage the relatively rotating fluid in the operating chamber 33 and generate a localized region of relatively higher fluid pressure, thus continually pumping a small quantity of fluid back into the reservoir chamber 35 through the passages 47 and 49, as is well known in the art.

In the subject embodiment, and by way of example only, the input coupling member 11 includes a forward surface which defines a plurality of annular lands 53. The adjacent surface of the housing member 17 forms a plurality of annular lands 55. The annular lands 53 and 55 are interdigitated to define a serpentine-shaped viscous shear space therebetween. It is believed that in view of the above incorporation of U.S. Pat. No. 3,055,473 those skilled in the art can fully understand the construction and operation of the fluid coupling device illustrated in FIG. 1, as well as the various flow paths for the viscous fluid contained therein. Briefly, when torque is transmitted from the vehicle engine by means of the input shaft 21 to the input coupling member 11, the result is a shearing of the viscous fluid contained in the shear space between the annular lands 53 and 55, the shear space also being referred to hereinafter by the reference numerals 53 and 55.

Figure 2:
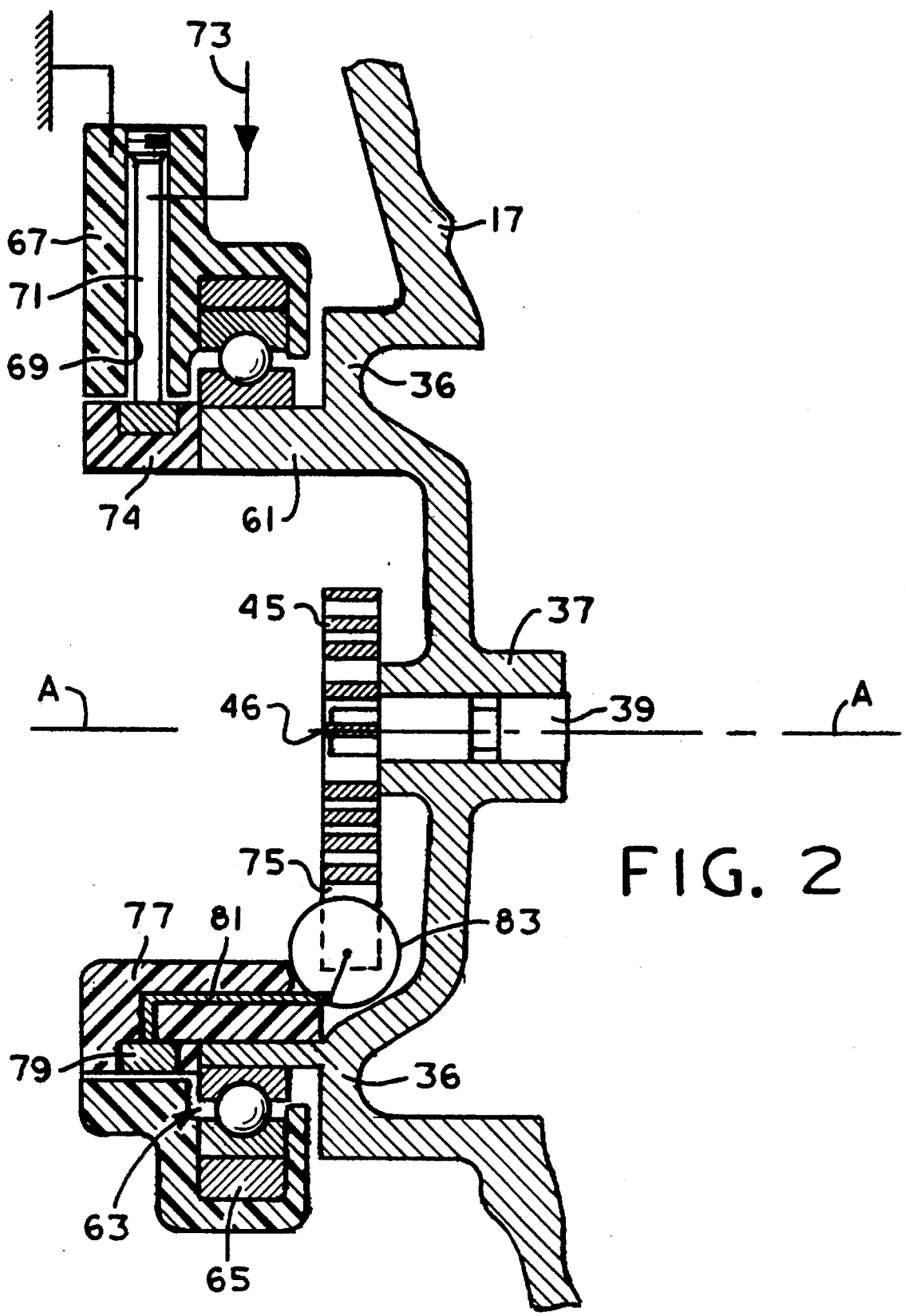
FIG. 2 is an enlarged, fragmentary axial cross-section, similar to FIG. 1, illustrating one aspect of the present invention.

Referring now to FIG. 2, in conjunction with FIG. 1, the present invention will be described. The cast cover member 17 includes, cast integrally therewith, a forwardly-extending annular support portion 61. Disposed about a cylindrical outer surface of the support portion 61 is an inner race of a bearing set 63. In the subject embodiment, the outer race of the bearing set 63 is illustrated as being surrounded by an annular support ring 65, with both the bearing set 63 and the ring 65 being encapsulated within a molded plastic housing 67. As is shown schematically in FIG. 2, the plastic housing 67 is tethered so as to be stationary (i.e., relative to the vehicle chassis, radiator, etc.). The plastic housing 67 defines a radially oriented opening 69 within which is reciprocally disposed a brush member 71. An electrical input signal, schematically designated 73 is transmitted to the brush member 71 for reasons which will be described subsequently.

Attached by suitable means to the annular support portion 61 is a molded, plastic annular support member 74. About most of its circumference, the support member 74 has the axial cross-section illustrated in the upper half of FIG. 2. However, adjacent an outer radial tab 75 of the bimetal coil 45, the support member 74 includes a portion 77 which is disposed radially inward of the annular support portion 61. Received within an annular outer channel defined by the plastic support member 74 is a commutating ring 79, to which is attached an electrical lead 81, disposed within the plastic portion 77.

The electrical lead 81 is connected to an electromagnetic actuator 83 which, in the subject embodiment, is of the type having an electromagnetic coil 84 and an output plunger 85 (shown only in FIG. 3) which is attached to the outer radial tab 75 of the bimetal coil 45. The electromagnetic actuator 83, in the subject embodiment, is of the type in which the output plunger 85 is spring biased to a fully extended position shown in FIG. 3, but as the input signal 73 begins to increase, the electrical current applied to the coil of the actuator 83 exerts a magnetic force tending to retract the plunger 85 in opposition to the force of the biasing spring.

However, it should be understood that the invention is not limited to any particular actuator configuration or mode of operation. For example, the actuator could be of either the proportional type, wherein the position of the plunger 85 is generally proportional to the applied signal, or alternatively, could be of the ON-OFF type in which the plunger 85 has either a fully extended position or a fully retracted position, in response to the input signal 73 being either ON or OFF.

Figure 3:
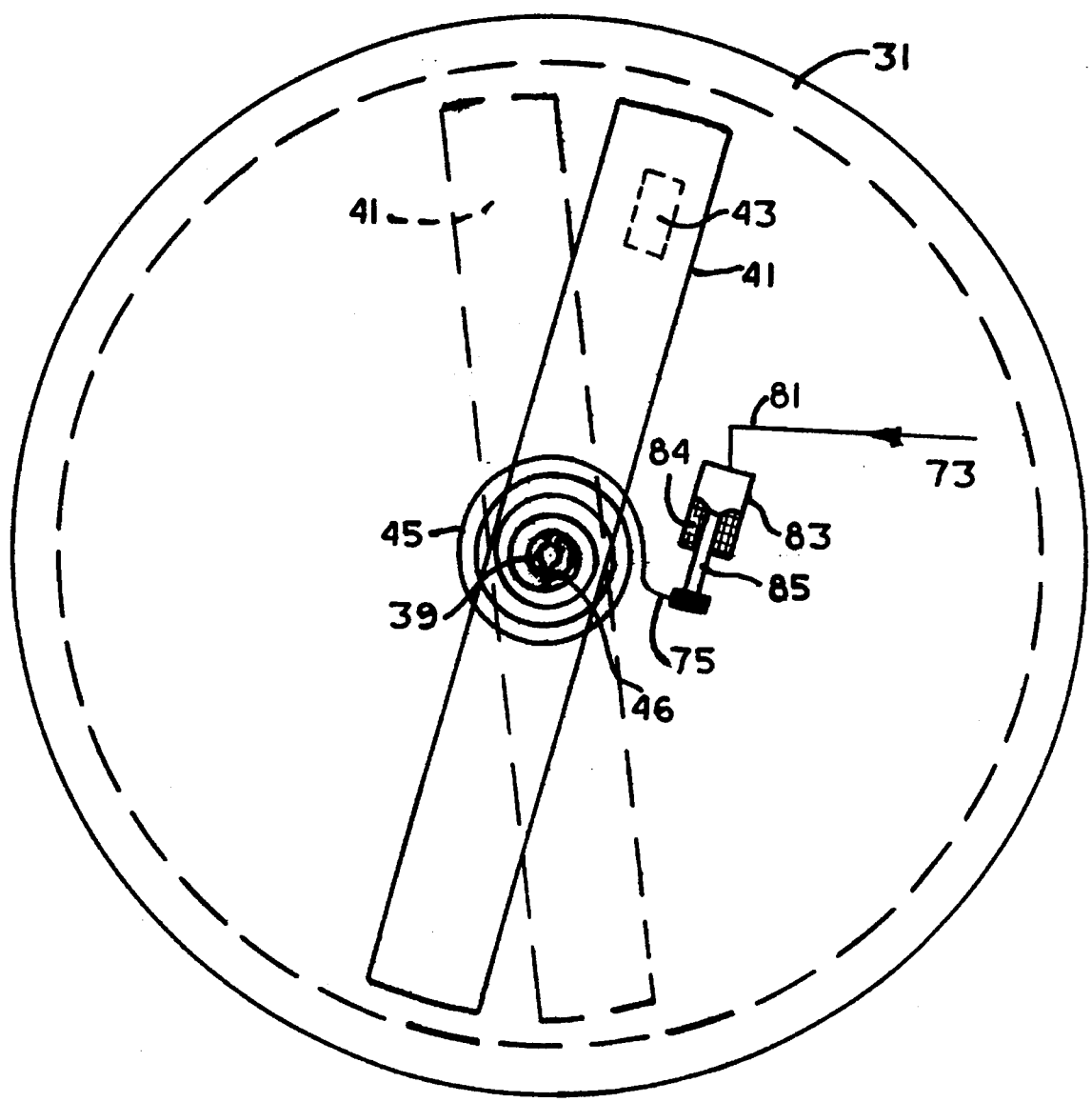
FIG. 3 is a somewhat schematic front plan view of a portion of the fluid coupling device of the present invention, illustrating the operation of the invention.

The operation of the present invention will now be described, referring primarily to FIG. 3. As was described previously, with no input signal 73 being received (signal OFF), the plunger 85 is fully extended to the position shown in FIG. 3, wherein the outer radial tab 75 is located in its "normally fixed" position, i.e., in the position the tab 75 has traditionally occupied in prior art fluid coupling devices in which the outer tab of the bimetal coil was truly fixed, and therefore, immoveable during operation. The "normally fixed" position of the tab 75 corresponds to the solid line position of the valve arm 41, in which the valve arm covers the fill opening 43. This position of the valve arm 41 would correspond to a low ambient air temperature in the region adjacent the bimetal coil 45, for example a temperature of about 160° F.

If the air conditioning compressor begins to operate, or alternatively, if the condenser pressure reaches a predetermined limit, an appropriate input signal 73 is transmitted to the fluid coupling device, and by means of the electrical lead 81 to the actuator 83. In response to the increasing input signal 73, the plunger 85 is fully retracted, thus moving the outer tab 75 of the bimetal coil 45 upward in FIG. 3 to a position adjacent the lower end of the actuator 83. As this occurs, and without any change in the ambient air temperature, the valve arm 41 will rotate from the solid line position shown in FIG. 3 to the dashed line position, uncovering the fill opening 43. With the fill opening 43 uncovered, the fluid coupling device will go from its disengaged mode to its engaged mode in a manner which is well known to those skilled in the art.

In other words, the plunger 85 of the actuator 83 moves the outer tab 75 from its "normal" position (i.e., its position if it were controlled only by the bimetal 45) to an "actuated" position. As used herein, and in the appended claims, the term "actuated" in regard to the outer tab 75 simply means that the tab 75 is moved by the actuator 83 from its normal position, but doesn't necessarily mean that the fan drive will thereafter operate in an engaged condition. For example, the vehicle logic controlling the input signal 73 could be reversed, from that in the previous description, to move the valve arm 41 from the dashed line position shown in FIG. 3 (engaged condition) to the solid line position (disengaged condition) when the engine speed exceeds a predetermined limit, regardless of ambient air temperature. In that case, moving the outer tab 75 from its normal position to its "actuated" position would result in the fan drive operating in the disengaged condition.

It should be understood that moving the outer, normally-fixed tab 75 of the bimetal coil does not actually modify the "gain" of the coil, but just the temperature at which the valve arm first begins to uncover the fill opening 43. In other words, the shape of the curve is not changed, but the entire curve is merely raised or lowered.

Although the present invention has been described in connection with a fan drive of the type in which the valve member is controlled by a bimetal coil, those skilled in the art will recognize that the invention is not so limited. For example, the invention could readily be applied to a fan drive of the type in which the bimetal comprises a generally flat member, a portion of which moves axially to move a valve arm axially toward or away from a valve plate and fill opening. On such a fan drive, the actuator would again have the actuator member attached to a normally fixed portion of the flat bimetal strip, although, in such an arrangement, it is likely that the actuator member would have to move along an axis parallel to the axis of rotation of the fan drive. It is believed to be within the ability of those skilled in the art to apply the present invention to a fan drive of the axial valve type, based upon a reading and understanding of the present specification.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fluid coupling device of the type including a first rotatable coupling member defining an axis of rotation, enclosure means associated with said first coupling member to define a fluid chamber therebetween; valve means associated with said first coupling member and disposed to separate said fluid chamber into a fluid operating chamber and a fluid reservoir chamber; a second rotatable coupling member disposed in said fluid operating chamber and being rotatable relative to said first coupling member; one of said first coupling member and said enclosure means cooperating with said second coupling member to define a viscous shear space therebetween, said valve means being operable to control the flow of fluid between said reservoir chamber and said operating chamber, and including means defining a fluid inlet port and a valve member movable between an open position permitting fluid flow through said inlet port, and a closed position (FIG. 3) substantially blocking fluid flow through said inlet port; a valve shaft operably associated with said valve member for movement therewith, and a bimetal element operably associated with said enclosure means and in operable engagement with said valve shaft to move said valve member between said open and closed positions in response to variations in ambient air temperature, said bimetal element including a movable portion in operable engagement with said valve shaft, and a portion normally fixed relative to said enclosure means; characterized by:

(a) actuator means operably associated with said enclosure means for rotation therewith;

(b) said actuator means including an actuator member in operable engagement with said normally fixed portion of said bimetal element, and operable in response to variations in a predetermined condition, to move said normally fixed portion between a normal position (FIG. 3) and an actuated position.

2. A fluid coupling device as claimed in claim 1, characterized by, when said ambient air temperature is relatively low, said normal position (FIG. 3) of said normally fixed portion of said bimetal element corresponds to said closed position of said valve member, and said actuated position of said normally fixed portion corresponds to said open position (FIG. 3) of said valve member.

3. A fluid coupling device as claimed in claim 1, characterized by said bimetal element comprises a bimetal coil member including an inner end portion comprising said movable portion, and an outer end portion comprising said normally fixed portion.

4. A fluid coupling device as claimed in claim 3, characterized by said enclosure means comprising a cover member including a generally cylindrical support portion concentric about said axis of rotation, said valve shaft being rotatably supported by said cylindrical support portion, and in engagement with said inner end portion of said bimetal coil member.

5. A fluid coupling device as claimed in claim 1, characterized by said actuator means comprises an actuator housing fixed relative to said enclosure means, and said actuator member being movable relative to said actuator housing, in response to an input signal, said input signal being responsive to said variations in said predetermined condition.

6. A fluid coupling device as claimed in claim 5, characterized by said actuator means comprises an electromagnetic actuator including an electromagnetic coil energizable in response to said input signal, to apply an electromagnetic force to said actuator member.

7. A fluid coupling device as claimed in claim 1, characterized by means operable to transmit said input signal to said actuator means.

8. A fluid coupling device as claimed in claim 7, characterized by said means for transmitting said input signal comprises an electrically conductive commutating ring mounted for rotation with said enclosure means, and an electrically conductive brush member which is stationary, receives said input signal, and is in operable engagement with said commutating ring.

9. A fluid coupling device as claimed in claim 8, characterized by support means operably fixed to said enclosure means and receiving said commutating ring, and further characterized by stationary housing means receiving and supporting said brush member, said rotatable enclosure means being supported relative to said stationary housing means by bearing means.

* * * * *